US008205501B2

(12) United States Patent
Nakamura et al.

(10) Patent No.: US 8,205,501 B2
(45) Date of Patent: Jun. 26, 2012

(54) MOUNTING STRUCTURE OF ULTRASONIC SENSOR

(75) Inventors: Tadashi Nakamura, Hoi-gun (JP); Takeo Tsuzuki, Toyota (JP)

(73) Assignee: Denso Corporation, Kariya (JP)

( * ) Notice: Subject to any disclaimer, the term of this patent is extended or adjusted under 35 U.S.C. 154(b) by 407 days.

(21) Appl. No.: 12/565,981

(22) Filed: Sep. 24, 2009

(65) Prior Publication Data

US 2010/0071472 A1 Mar. 25, 2010

(30) Foreign Application Priority Data

Sep. 25, 2008 (JP) ................................ 2008-246669

(51) Int. Cl.
*G01N 29/00* (2006.01)

(52) U.S. Cl. ........................................ 73/632; 73/866.5

(58) Field of Classification Search .................... 73/632, 73/866.5, 584; 293/117
See application file for complete search history.

(56) References Cited

U.S. PATENT DOCUMENTS 3,883,168 A * 5/1975 Goupy et al. ................. 293/120
5,071,500 A * 12/1991 Kumagai et al. .............. 156/152
5,179,152 A * 1/1993 Shimaoka et al. ............ 524/494
5,639,173 A * 6/1997 Eng ................................ 403/59
5,788,297 A * 8/1998 Sugawara et al. ............. 293/102
7,497,121 B2 * 3/2009 Okuda et al. ..................... 73/632
7,554,248 B2 * 6/2009 Oda et al. ...................... 310/348
2006/0232081 A1 10/2006 Sato et al.
2008/0184802 A1 8/2008 Sato
2009/0223296 A1 9/2009 Sato et al.

FOREIGN PATENT DOCUMENTS

JP 2006-023019 1/2006
JP 2006-337028 12/2006

OTHER PUBLICATIONS

U.S. Appl. No. 12/399,582, Sato et al., filed Mar. 6, 2009.

* cited by examiner

*Primary Examiner* — J M Saint Surin
(74) *Attorney, Agent, or Firm* — Nixon & Vanderhye PC

(57) ABSTRACT

A mobile object includes a wall member to which an ultrasonic sensor is fixed. The wall member has a through hole through which an oscillating face of the ultrasonic sensor is exposed from the wall member. A closing member closes a gap generated between the wall member and the ultrasonic sensor. The closing member connects an edge of the through hole located outside of the wall member and an edge of the oscillating face of the ultrasonic sensor. The closing member has an outer face exposed from the wall member, and the outer face of the closing member has asperities.

7 Claims, 3 Drawing Sheets

MOUNTING STRUCTURE OF ULTRASONIC SENSOR

CROSS REFERENCE TO RELATED APPLICATION

This application is based on Japanese Patent Application No. 2008-246669 filed on Sep. 25, 2008, the disclosure of which is incorporated herein by reference in its entirety.

BACKGROUND OF THE INVENTION

1. Field of the Invention

The present invention relates to a mounting structure of an ultrasonic sensor.

2. Description of Related Art

JP-A-2006-337028 discloses a mounting structure of an ultrasonic sensor. The ultrasonic sensor is mounted to a wall member of a mobile object such as a bumper of a vehicle. The ultrasonic sensor accommodates an ultrasonic oscillator, and is fixed to the wall member by a fixing member. The fixing member is located on an inner side of the wall member, or the fixing member is located in a through hole defined in the wall member. The ultrasonic sensor is fixed such that an oscillating face of the ultrasonic oscillator is exposed from the wall member through the through hole. A gap generated between the wall member and the ultrasonic sensor is closed by a closing member such as flange.

The closing member has an outer face exposed from the wall member, and the outer face of the closing member is coated with paint. If adhesion performance of the paint relative to the outer face of the closing member is low, appearance of the mobile object may be worse.

SUMMARY OF THE INVENTION

In view of the foregoing and other problems, it is an object of the present invention to provide a mounting structure of an ultrasonic sensor.

According to a first example of the present invention, a mounting structure of an ultrasonic sensor includes an ultrasonic sensor having an ultrasonic element, and a mobile object having a wall member, and a closing member. The ultrasonic sensor is fixed to the wall member, and the wall member has a through hole through which an oscillating face of the ultrasonic sensor is exposed from an outer face of the wall member. The closing member closes a gap generated between the through hole of the wall member and the ultrasonic sensor. The closing member connects an edge of the through hole located outside of the wall member and an edge of the osculating face of the ultrasonic sensor. The closing member has an outer face exposed from the outer face of the wall member, and the outer face of the closing member has asperities.

According to a second example of the present invention, a mounting structure of an ultrasonic sensor includes an ultrasonic sensor, a wall member, a closing member, and a fixing member. The ultrasonic sensor has an oscillating face arranged to extend in a vertical direction. The wall member is inclined relative to the oscillating face, and the ultrasonic sensor is mounted to the inclined wall member. The oscillating face is exposed from the inclined wall member through a through hole defined in the inclined wall member. The closing member closes a gap generated between the inclined wall member and the ultrasonic sensor. The fixing member fixes the ultrasonic sensor and the closing member to the inclined wall member. The closing member has an outer face exposed from the inclined wall member, and the outer face of the closing member has asperities.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

A mounting structure of an ultrasonic sensor 10 will be described, in a case that the ultrasonic sensor 10 is mounted to a bumper 70 of a vehicle as an example of a mobile object. Alternatively, the ultrasonic sensor 10 may be mounted to a chassis or molding of the vehicle.

A vertical direction Y is defined to be vertical relative to a ground. A mounting direction Z is defined to be parallel to the ground, and the ultrasonic sensor 10 is mounted in the mounting direction Z. A lateral direction X is defined to be parallel to the ground, and is defined to be vertical to the mounting direction Z.

The ultrasonic sensor 10 sends ultrasonic wave, and receives ultrasonic wave reflected by an obstacle. The ultrasonic sensor 10 has a casing 11 made of polybutylene terephthalate (PBT), for example. The casing 11 accommodates an ultrasonic oscillator, a processing circuit board, and an absorber. The processing circuit board applies drive voltage to the ultrasonic oscillator so as to generate ultrasonic wave, and processes voltage signal transmitted from the ultrasonic oscillator due to back electromotive voltage effect. The absorber absorbs unnecessary oscillation generated in the ultrasonic sensor 10 when the ultrasonic sensor 10 sends and receives ultrasonic wave. The ultrasonic oscillator may correspond to an ultrasonic element.

Figure 3:
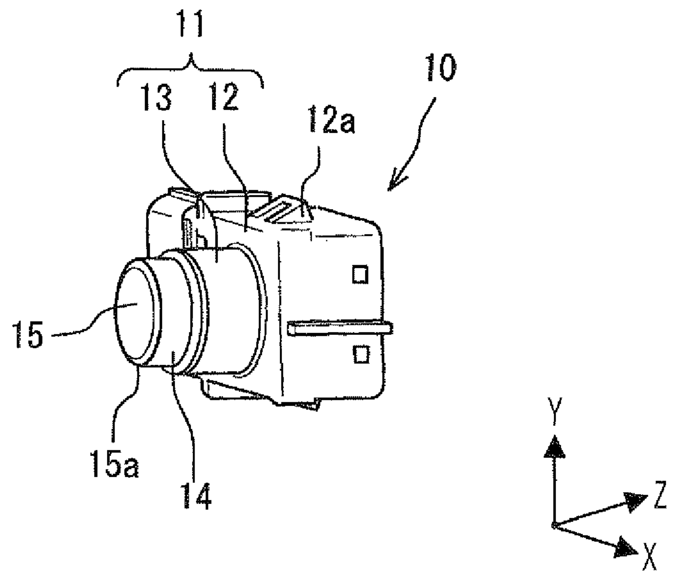
FIG. 3 is a perspective view illustrating the ultrasonic sensor.

As shown in FIG. 3, the casing 11 includes a rear part 12 accommodating the processing circuit board, and a front part 13 accommodating the ultrasonic oscillator. The front part 13 protrudes from a face of the rear part 12, and has an approximately cylinder shape. When the ultrasonic sensor 10 is mounted in a fixing member 30, a fitting **12*a* of the rear part 12 is fitted with a fitting 31*a* of a first part 31 of the fixing member 30**.

The ultrasonic oscillator may correspond to a piezoelectric element bonded to an inner face of an end portion 14 of the front part 13, and the inner face is approximately perpendicular to the mounting direction Z. A reverse side of the inner face is defined to be an outer face of the end portion 14 of the ultrasonic sensor 10, and the outer face represents an oscillating face 15 of the ultrasonic sensor 10. The fixing member 30 fixes the ultrasonic sensor 10 to the bumper 70 such that the oscillating face 15 is approximately perpendicular to the horizontal direction. Thus, the oscillating face 15 can be maintained to have directivity of the horizontal direction relative to the ground.

Figure 2:
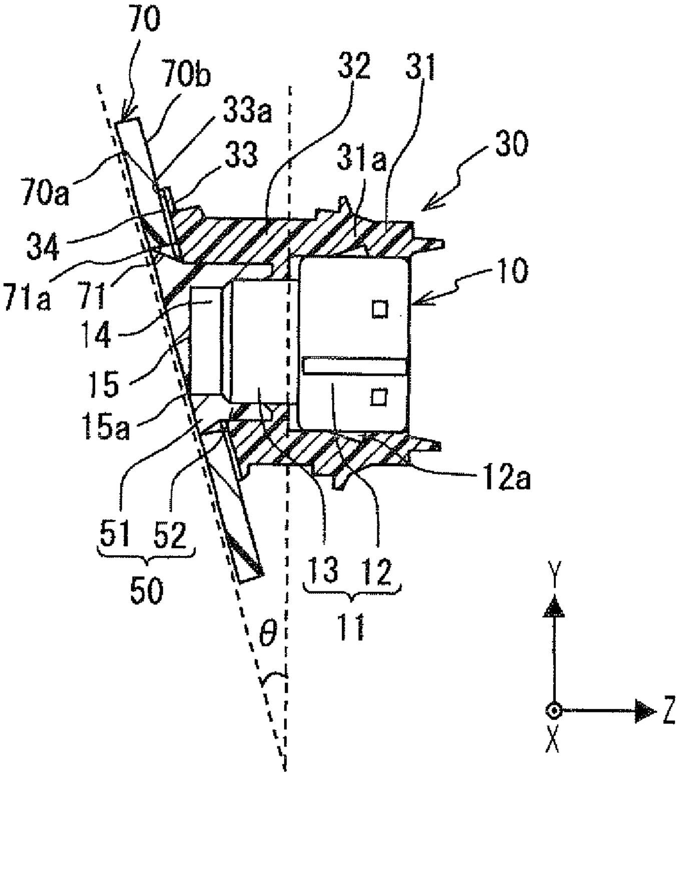
FIG. 2 is a cross-sectional view illustrating the mounting structure of the ultrasonic sensor of FIG. 1.

As shown in FIG. 2, an outer face 70*a* and an inner face 70*b* of the bumper 70 are inclined relative to the vertical direction Y toward the horizontal direction by an angle of θ. Therefore, a through hole 71 defined in the bumper 70 has a pass-through direction inclined relative to the mounting direction Z toward the vertical direction Y by the angle of θ. The pass-through direction of the through hole 71 corresponds to a thickness direction of the bumper 70. Thus, a center of the oscillating face 15 and a center of the through hole 71 are offset from each other, such that non-uniform gap is generated between the end portion 14 of the ultrasonic sensor 10 and the through hole 71 of the bumper 70.

Figure 1:
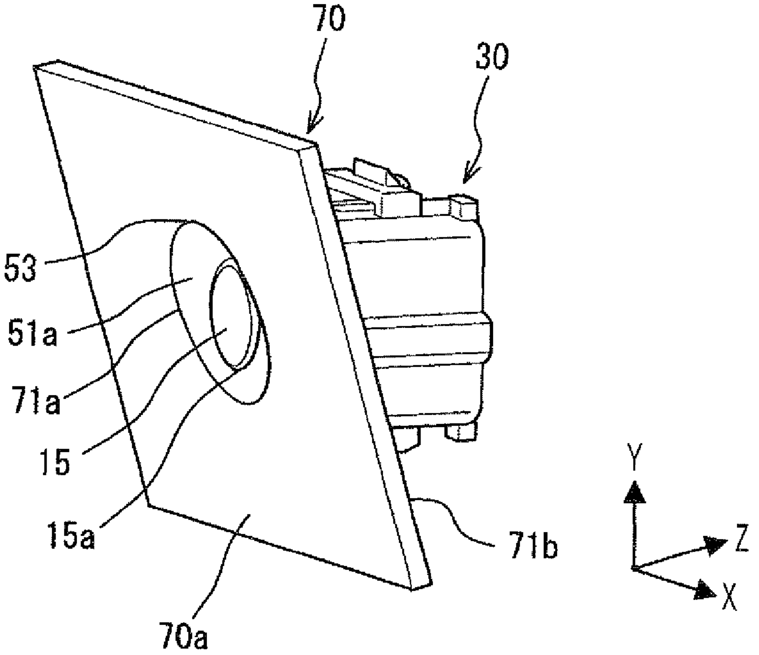
FIG. 1 is a perspective view illustrating a mounting structure of an ultrasonic sensor according to an embodiment of the present disclosure.

As shown in FIG. 1 and FIG. 2, the fixing member 30 fixes the ultrasonic sensor 10 to the bumper 70, such that the oscillating face 15 of the ultrasonic sensor 10 is exposed from the outer face 70*a* of the bumper 70 through the through hole 71 defined in the bumper 70.

Figure 4:
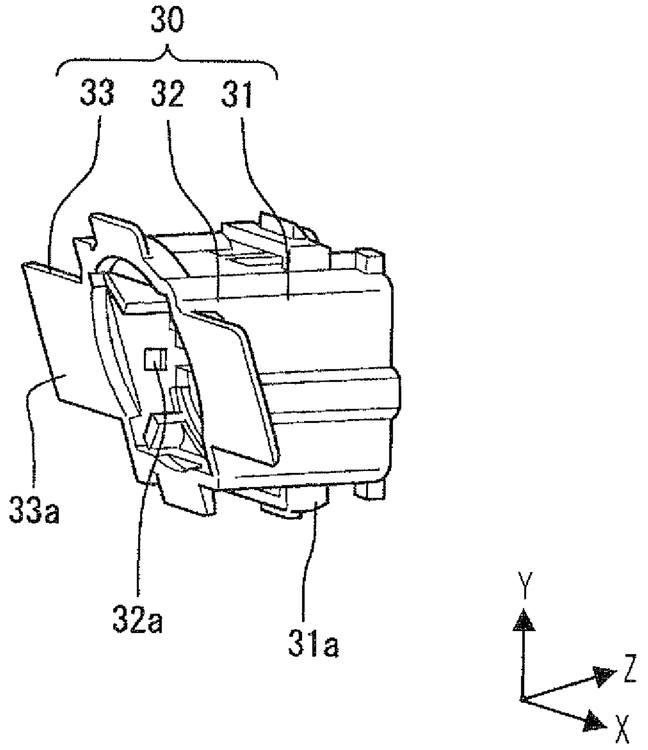
FIG. 4 is a perspective view illustrating a fixing member of the mounting structure.

The fixing member 30 is made of the PBT, and includes the first part 31, a second part 32, and a third part 33, as shown in FIG. 4. The ultrasonic sensor 10 is fixed in the fixing member 30 through the first part 31 so as to be fixed to the bumper 70. A closing member 50 is fixed to the fixing member 30 through the second part 32 so as to be fixed to the bumper 70. The fixing member 30 is fixed to the bumper 70 through the third part 33. The first part 31 and the second part 32 are integrally connected to each other in the mounting direction Z.

Relative to a dashed line of FIG. 2 extending in the vertical direction Y, a right part of the fixing member 30 corresponds to the first part 31, and a left part of the fixing member 30 corresponds to the second part 32. The first part 31 has the fitting 31*a* to be fitted with the fitting 12*a* of the rear part 12 of the casing 11 of the ultrasonic sensor 10. The second part 32 has a fitting 32*a* shown in FIG. 4 to be fitted with a fitting 52*a* of an engaging part 52 of the closing member 50 shown in FIG. 5. The third part 33 extends from an opening of the second part 32 in the lateral direction X with the same inclined angle as the bumper 70. As shown in FIG. 2, an adhesive 34 is applied to a face 33*a* of the third part 33 opposing to the bumper 70, such that the fixing member 30 is fixed to the bumper 70.

Figure 5:
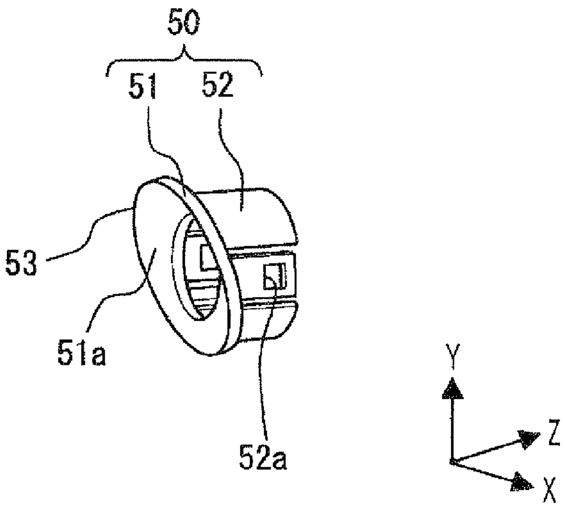
FIG. 5 is a perspective view illustrating a closing member of the mounting structure.

The closing member 50 closes a gap generated between the through hole 71 of the bumper 70 and the ultrasonic sensor 10, and is made of glass-containing resin. For example, the glass-containing resin is produced by mixing glass fibers in the PBT. As shown in FIG. 5, the closing member 50 includes a connecting part 51 and the engaging part 52. As shown in FIG. 2, when the ultrasonic sensor 10 and the closing member 50 are mounted and fixed to the bumper 70 by the fixing member 30, the connecting part 51 connects an edge 71*a* of the through hole 71 located on the outer face 70*a* of the bumper 70 and an edge 15*a* of the oscillating face 15 of the ultrasonic sensor 10. The engaging part 52 is engaged with the fixing member 30.

As shown in FIG. 5, the connecting part 51 has a double ring shape to surround the oscillating face 15. The shape of the connecting part 51 may be changed in accordance with a shape of the bumper 70 such as thickness, curvature radius, or angle relative to the vertical direction Y. The shape of the connecting part 51 may be changed in accordance with a shape of the oscillating face 15 such as diameter dimension. The engaging part 52 has a tube shape to surround the front part 13 of the casing 11 of the ultrasonic sensor 10, and has the fitting 52*a* to be fitted with the fitting 32*a* of the second part 32 of the fixing member 30.

A mounting process for mounting the ultrasonic sensor 10 to the bumper 70 will be described. The closing member 50 is inserted into the fixing member 30 through an opening of the second part 32. The fitting 52*a* of the engaging part 52 of the closing member 50 is fitted to the fitting 32*a* of the second part 32 of the fixing member 30. Thus, the closing member 50 is fixed to the fixing member 30.

The adhesive 34 is applied to the face 33*a* of the third part 33 of the fixing member 30 opposing to the bumper 70. The third part 33 is pressed and fixed to the inner face 70*b* of the bumper 70, such that a gap between the through hole 71 and the connecting part 51 of the closing member 50 can filled all around the through hole 71. Thus, the closing member 50 and the fixing member 30 are connected and fixed to the inner face 70*b* of the bumper 70.

The ultrasonic sensor 10 is inserted into the fixing member 30 through an opening of the first part 31. The fitting 12*a* of the rear part 12 of the casing 11 of the ultrasonic sensor 10 is fitted to the fitting 31*a* of the first part 31 of the fixing member 30. Thus, the ultrasonic sensor 10 is mounted and fixed to the fixing member 30. Accordingly, the ultrasonic sensor 10 can be mounted and fixed to the bumper 70.

An outer face 51*a* of the connecting part 51 of the closing member 50 exposed from the outer face 70*a* of the bumper 70 is coated with paint so as to improve appearance of the vehicle. The outer face 51*a* is colored in the same color as the outer face 70*a* of the bumper 70. The coloring of the closing member 50 may be performed after the ultrasonic sensor 10 is mounted to the bumper 70, or may be performed before the ultrasonic sensor 10 is mounted to the bumper 70. The closing member 50 is made of the glass-containing resin produced by mixing glass fibers in the PBT.

Figure 6:
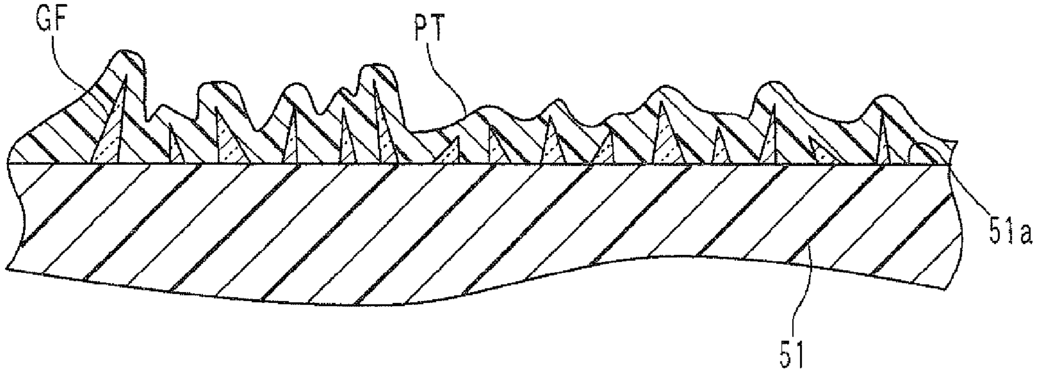
FIG. 6 is an enlarged cross-sectional view illustrating asperities of an outer face of the closing member.

Therefore, as shown in FIG. 6, glass fibers GF mixed in the PBT are exposed from the outer face 51*a* of the connecting part 51, such that minute asperities are formed on the outer face 51*a*. When paint PT is applied to the outer face 51*a* having the asperities, the paint PT is caught by the glass fibers GF exposed as concave parts and convex parts of the asperities, because a contact area between the paint PT and the outer face 51*a* is increased by the glass fibers GF.

The glass fibers GF correspond to the convex parts of the asperities. The paint PT is supported by the concave part located between the convex parts, such that adhesion performance of the paint PT is increased, compared with a case in which the outer face 51*a* is flat.

Thus, adhesion performance of the paint PT can be improved, when the asperities are formed on the outer face 51*a* of the connecting part 51.

According to the embodiment, adhesion performance of the paint can be improved relative to the outer face 51*a* of the connecting part 51 of the closing member 50 exposed from the outer face 70*a* of the bumper 70.

The fixing member 30 is made of the PBT, and the closing member 50 is made of the glass-containing resin produced by mixing the glass fibers in the PBT. In a comparison example, the fixing member 30 and the closing member 50 are integrally produced by using the glass-containing resin so as to improve the adhesion performance of the paint. However, the fixing member 30 is less pliable in the comparison example, compared with a case in which the fixing member 30 is made of only the PBT. In this case, when the ultrasonic sensor 10 is fixed to the fixing member 30, the fitting 31*a* of the fitting member 30 to be fitted with the ultrasonic sensor 10 may be easily damaged.

In contrast, when the fixing member 30 is made of the PBT, and when the closing member 50 is made of the glass-containing resin, the adhesion performance between the paint and the closing member 50 can be improved, and a pliability of the fixing member 30 can be maintained.

The fixing member 30 is made of the polybutylene terephthalate (PBT). However, the fixing member 30 is not limited to be made of the PBT, and may be made of thermoplastic resin satisfying a predetermined molding accuracy and strength. For example, the fixing member 30 may be made of polyacetal, polyoxymethylene (POM), or polypropylene (PP). However, the PST is chemically stable against heat or pollution, compared with the POM or the PP. When the fixing member 30 fixes the ultrasonic sensor 10 to the bumper 70, and when the ultrasonic sensor 10 is exposed outside of the vehicle, the fixing member 30 may be made of the PBT.

The asperities are formed on the closing member 50, because the closing member 50 is made of the glass-containing resin produced by mixing glass fibers in the PBT. Alternatively, the asperities may be formed by using a molding die. The molding die of the closing member 50 may have the asperities at a position corresponding to the outer face 51*a* of the connecting part 51. The closing member 50 can be formed by injecting melted resin into the molding die and cooling the injected resin to be solid. Thus, the asperities can be formed on the outer face 51*a* of the connecting part 51 by using the molding die in which the asperities are formed in advance.

In this case, because both of the closing member 50 and the fixing member 30 can be made of the PBT, the closing member 50 and the fixing member 30 can be integrally molded by using a single molding die. Therefore, a process for forming the closing member 50 and the fixing member 30 can be simple, compared with a case in which the closing member 50 and the fixing member 30 are separately produced. Further, when the closing member 50 and the fixing member 30 are integrally formed, a process for fixing the closing member 50 to the fixing member 30 is not needed, thereby a process for mounting the ultrasonic sensor 10 to the bumper 70 can be more simple.

The asperities of the molding die is formed by arranging a film having a predetermined asperities pattern to the molding die. When a predetermined amount of acid is applied to the arranged film, the molding die is melted by the acid so as to have the predetermined asperities pattern. The arranged film is removed after the asperities are formed on the molding die.

Such changes and modifications are to be understood as being within the scope of the present invention as defined by the appended claims.

What is claimed is:

1. A mounting structure of an ultrasonic sensor comprising:
an ultrasonic sensor having an ultrasonic element;
a mobile object including a wall member to which the ultrasonic sensor is fixed, the wall member having a through hole through which an oscillating face of the ultrasonic sensor is exposed from an outer face of the wall member; and
a closing member to close a gap generated between the through hole of the wall member and the ultrasonic sensor, wherein
the closing member connects an edge of the through hole located outside of the wall member and an edge of the oscillating face of the ultrasonic sensor,
the closing member has an outer face exposed from the outer face of the wall member, and
the outer face of the closing member has asperities.

2. The mounting structure according to claim 1, further comprising:
a fixing member located on an inner side of the wall member, wherein
the fixing member fixes the ultrasonic sensor to the wall member,
the fixing member is made of thermoplastic resin, and
the closing member is made of thermoplastic resin having glass fibers.

3. The mounting structure according to claim 1, further comprising:
a fixing member located on an inner side of the wall member, wherein
the fixing member fixes the ultrasonic sensor to the wall member, and
the fixing member and the closing member are integrally made with a same material.

4. A mounting structure of an ultrasonic sensor comprising:
an ultrasonic sensor having an oscillating face arranged to extend in a vertical direction;
a wall member to which the ultrasonic sensor is mounted, the wall member being inclined relative to the oscillating face, the oscillating face being exposed from the inclined wall member through a through hole defined in the inclined wall member;
a closing member to close a gap generated between the inclined wall member and the oscillating face; and
a fixing member to fix the ultrasonic sensor and the closing member to the inclined wall member, wherein
the closing member has an outer face exposed from the inclined wall member, and
the outer face of the closing member has asperities.

5. The mounting structure according to claim 4, wherein
the closing member is made of resin having glass fibers, and
the asperities of the outer face of the closing member are defined by the glass fibers.

6. The mounting structure according to claim 5, wherein
the fixing member is made of resin having a pliability.

7. The mounting structure according to claim 4, wherein
the fixing member and the closing member are integrally made of resin having a pliability, and
the asperities of the outer face of the closing member is configured to be produced by using a molding die having a pattern corresponding to a shape of the asperities.

* * * * *